(12) United States Patent
Bertini et al.

(10) Patent No.: US 9,879,782 B2
(45) Date of Patent: Jan. 30, 2018

(54) SEAL AND CORRESPONDING MANUFACTURING METHOD

(75) Inventors: Mario Bertini, Bellinzago Lombardo (IT); Raffaello Ravanelli, Cambiago (IT)

(73) Assignee: TENUTE S.R.L., Milan (IT)

( * ) Notice: Subject to any disclaimer, the term of this patent is extended or adjusted under 35 U.S.C. 154(b) by 997 days.

(21) Appl. No.: 13/055,306

(22) PCT Filed: Jul. 20, 2009

(86) PCT No.: PCT/IB2009/053141
§ 371 (c)(1),
(2), (4) Date: Mar. 25, 2011

(87) PCT Pub. No.: WO2010/010507
PCT Pub. Date: Jan. 28, 2010

(65) Prior Publication Data
US 2012/0104701 A1    May 3, 2012

(30) Foreign Application Priority Data
Jul. 21, 2008 (IT) .............................. MO2008A0196

(51) Int. Cl.
*F16J 15/3212* (2016.01)
*F16J 15/3252* (2016.01)

(52) U.S. Cl.
CPC ....... *F16J 15/3212* (2013.01); *F16J 15/3252* (2013.01); *Y10T 29/4998* (2015.01)

(58) Field of Classification Search
USPC ......................................... 277/572, 573, 549
See application file for complete search history.

(56) References Cited

U.S. PATENT DOCUMENTS

| | | | | | |
|---|---|---|---|---|---|
| 2,208,482 | A | * | 7/1940 | Victor ........................... | 277/569 |
| 2,434,485 | A | * | 1/1948 | Chambers, Jr. ................ | 277/555 |
| 2,631,906 | A | * | 3/1953 | Brock ............................ | 277/555 |
| 2,692,786 | A | * | 10/1954 | Reynolds ....................... | 277/573 |
| 2,736,584 | A | * | 2/1956 | Riesing .......................... | 277/573 |
| 2,830,858 | A | * | 4/1958 | Moorman et al. ............. | 384/484 |
| 2,868,566 | A | | 1/1959 | Kosatka | |
| 3,467,395 | A | * | 9/1969 | Kan ............................... | 277/551 |
| 3,495,843 | A | * | 2/1970 | Andersen et al. ............. | 277/505 |
| 3,743,305 | A | * | 7/1973 | Berens et al. ................. | 277/574 |
| 4,015,883 | A | * | 4/1977 | Taylor ........................... | 384/484 |
| 4,172,599 | A | * | 10/1979 | Forch ............................. | 277/552 |
| 4,274,641 | A | * | 6/1981 | Cather, Jr. .................... | 277/309 |

(Continued)

FOREIGN PATENT DOCUMENTS

| | | |
|---|---|---|
| EP | 0 562 160 | 9/1993 |
| GB | 612 830 | 11/1948 |

(Continued)

*Primary Examiner* — Eugene G Byrd
(74) *Attorney, Agent, or Firm* — Silvia Salvadori, P.C.; Silvia Salvadori

(57) ABSTRACT

A seal comprises an annular portion having a static seal surface in contact with a first element and made of an elastomeric material. An annular lip exerts a dynamic seal in relation to a second element. A garter spring and a leaf spring cooperate to maintain the annular lip in an operating configuration abutting on a sliding surface of the second element, whilst an annular locking element holds in position the leaf spring.

12 Claims, 4 Drawing Sheets

(56) References Cited

U.S. PATENT DOCUMENTS

| | | | | |
|---|---|---|---|---|
| 4,326,723 A | * | 4/1982 | Arai | 277/573 |
| 4,553,763 A | * | 11/1985 | Ehrmann | 277/561 |
| 4,981,303 A | * | 1/1991 | Matsushima et al. | 277/351 |
| 5,085,444 A | * | 2/1992 | Murakami et al. | 277/503 |
| 8,002,287 B2 | * | 8/2011 | Wagner | 277/551 |
| 2003/0173746 A1 | * | 9/2003 | Ramsay | 277/549 |

FOREIGN PATENT DOCUMENTS

| | | |
|---|---|---|
| GB | 689 193 | 3/1953 |
| GB | 2 213 878 | 8/1989 |

\* cited by examiner

SEAL AND CORRESPONDING MANUFACTURING METHOD

This application is a U.S. national stage of International Application No. PCT/IB2009/053141 filed Jul. 20, 2009, which claims priority to Italian Application No. MO2008A000196 filed Jul. 21, the contents of which are incorporated herein by reference.

This invention relates to a seal and a method for the manufacture thereof, in particular it refers to a radial seal for rotating movements to be interposed between a first element fixed to a second movable element for preventing the passage between two contiguous zones of fluid and solid substances such as lubricating and/or refrigerating substances, impurities, waste, residues and the like.

Radial seals are known that are arranged for being mounted on suitable seats of a fixed element, for example a hub or a support, such as to abut on a cylindrical sliding surface of a second element, typically a shaft or pivot, rotating at high speed and being subject to major misalignments compared with the first element.

A known seal of such a type, shown in the section of FIG. 1, comprises a seal lip 1 of annular shape made of elastomeric material, provided for the dynamic seal in relation to the second element. The seal lip 1 is vulcanised (or locked by a metal insert) on a metal box 2, which is also of annular shape. The metal box 2 is housed in use in a seat obtained on the first element or support. The seal lip 1 is preloaded by a garter spring 3 held in position by a first end of a leaf spring 4. The leaf spring 4 has a second end, opposite the first, that is in turn locked between an annular portion 5 made of elastomeric material and an annular element 6 made of metal material. This annular portion 5, which clads a surface of the box 2 opposite a static seal surface of the metal box, is made of a single piece with the seal lip 1 and enables the annular lip to be fixed. The annular element 6 is in turn fixed to the metal box 2 by arrangement of a folded fixing end of the metal box. In substance, the box 2 has a substantially L-shaped profile, with an end provided with an appendage folded 90° that extends along the long side of the L and gives rise to the aforesaid fixing end.

It should be observed that arranging an annular element 6 for locking the elastic arrangement 3 and 4 is advantageous because it enables the elastic arrangement to work effectively on the seal lip 1. It has, for example, been seen that the action of the elastic arrangement would not be equally effective if, instead of arranging an annular locking element 6, fixing the leaf spring 4 through direct vulcanisation on the spring were resorted to, as in this latter case the interaction between the elastic arrangement 3 and 4 and the seal lip 1 would produce excessive stiffness of the lip. On the other hand, in the solution in FIG. 1, the seal lip 1 is particularly effective as it is provided with a certain flexibility mainly by virtue of the fact that the first end of the leaf spring 4, i.e. the end that retains the garter spring 3 and is operationally in contact with the seal lip 1, is not stiffly connected to the annular lip but is practically only rested in freely sliding contact, such that when the seal lip 1 flexes during operation at a point, the first end of the elastic arrangement 3 and 4 can slide on the annular lip without significantly varying the elastic force exerted at that point.

Nevertheless, the known solution of FIG. 1—i.e. with the adoption of an annular locking element that enables a certain freedom of movement between the seal lip 1 and the corresponding elastic arrangement 3 and 4 but which, in order to achieve effective locking of the elastic arrangement, is in turn maintained in position through the metal box—is a drawback for other aspects.

In the first place, the seat of the element that receives the metal box 2 will necessarily be achieved with relatively great precision, i.e. with limited constructional tolerances, inasmuch as it has to be coupled with a seal surface (i.e. the static seal surface of the metal box 2) which, being metal, is relatively undeformable. As a consequence of this, in addition to the increased manufacturing costs, there is an early loss of the required tolerances due to the damage and wear to the seal surfaces, so after some mounting and dismantling operations of a seal, the seal (for example a new seal replacing a worn seal), will no longer be lockable in an operationally reliable work position. It will thus be indispensable to restore periodically the original dimensions of the seat of the seal, with a clear increase in costs.

In the second place, during mounting of the seal on the seal seat it will be necessary to exert significant inserting force, which obviously makes the entire operation not very easy and convenient.

In the third place, dismantling the seal from the seat of the seal almost inevitably causes some damage to the seal. It is thus necessary, in normal operations of maintenance of the rolling mill, to extract the seal. This extraction unfortunately causes undesired deformation of the seal that, in many cases, makes it impossible to reuse the seal and therefore makes it necessary to replace the seal.

The seal in FIG. 1 is further particularly complicated and expensive to manufacture owing to the need to manufacture separately various elements that have to be subsequently assembled with a relatively great number of subsequent operating steps.

An object of the invention is to make a seal that is able to overcome one or more of the aforesaid limits and drawbacks. Another object is to provide a seal that is constructionally simple and cheap.

A further object is to provide a seal that enables the risk of damage to a seat in which said seal is mounted to be reduced.

Still another object is to provide a method for manufacturing a seal that is particularly easy and cheap.

An advantage of the invention is to make available a seal that is able to maintain great reliability even in particularly heavy-duty working conditions, such as, for example, in the case of rolling-mill rollers with high working speed and/or great misalignments.

Another advantage is to provide a seal that is assemblable in a relatively practical and immediate manner.

A further advantage is to obtain a seal that is able to ensure, even in unfavourable operating conditions, an optimal dynamic seal that is constant and effective for a relatively great period of time.

Still another advantage is to make a seal that is very durable and resistant to wear and which can be made by a relatively simple, cheap and reliable process.

A first example of the invention is a seal, comprising:

an annular portion having a seal surface configured for the static seal in relation to a first element, said seal surface being made of an elastomeric material;

at least an annular lip configured for the dynamic seal in relation to a second element, said annular lip having a dynamic seal zone and a fixing zone, said dynamic seal zone extending in a circumferal direction around an axis, in particular an axis coinciding with a relative rotation axis between the first element and the second element, said fixing zone being fixed to said annular portion;

elastic arrangement comprising a first end configured for maintaining said dynamic seal zone of the annular lip abutting on said second element in a seal operating configuration, and a second end opposite the first end;

an annular locking element for locking said second end of the elastic arrangement, said second end of the elastic arrangement being interposed between said annular locking element and said annular portion.

A second embodiment of the invention is a seal made according to the first embodiment, in which said second end of the elastic arrangement is interposed between said annular locking element and said static seal surface of elastomeric material of the annular portion, said static seal surface being extended at least partially or mainly in a direction parallel to said axis, where "prevalently" is taken to mean that the component parallel to the axis is overall greater than the component that is perpendicular to the axis.

A third embodiment of the invention is a seal made according to the first or the secondembodiment in which said second end of the elastic arrangement has an annular shape extending around said axis and has a radial section extending prevalently in a direction parallel to said axis, where also in this case "prevalently" is taken to mean that the component parallel to the axis is overall greater than the component that is perpendicular to the axis.

A fourth embodiment of the invention is a seal made according to any preceding claim, in which said elastic arrangement has an annular shape extending around said axis and a radial section with two arms hinged together and arranged with respect to one another so as to define an angle, in particular of less than 90°.

A fifth embodiment of the invention is a seal made according to any preceding embodiment, in which said annular lip and said annular portion are made of a single body.

A sixth embodiment of the invention is a seal made according to any preceding embodiment, comprising first reinforcing arrangement embedded in an elastomeric material of said annular portion and interposed between said second end of the elastic arrangement and said static seal surface.

A seventh embodiment of the invention is a seal made according to the sixth example, in which said first reinforcing arrangement has an annular shape extending around said axis and a radial section extending prevalently in a direction parallel to said axis, where "prevalently" is taken to mean that the component parallel to the axis is overall greater than the component that is perpendicular to the axis.

An eighth embodiment of the invention is a seal made according to the sixth or seventh embodiment, in which said first reinforcing arrangement is made of a metal material.

A ninth embodiment of the invention is a seal made according to any of the embodiments from the sixth to the eighth in which said first reinforcing arrangement comprises at least two reinforcing rings embedded in the elastomeric material of said annular portion, said reinforcing rings extending around said axis and having diameters that are different from one another, an annular layer of elastomeric material being interposed between said two reinforcing rings.

A tenth embodiment of the invention is a seal made according to any proceeding embodiment, comprising a connecting portion that joins together said annular lip and said annular portion, said connecting portion being made of elastomeric material, said seal comprising a second reinforcing arrangement embedded in the elastomeric material of said connecting portion, said second reinforcing arrangement having an annular shape extending around said axis and a radial section extending prevalently in a direction that is perpendicular to said axis, where "prevalently" is taken to mean that the component perpendicular to the axis is overall greater than the component that is parallel to the axis.

An eleventh embodiment of the invention is a seal made according to any preceding embodiment, comprising a connecting portion that joins together said annular lip and said annular portion, said connecting portion being made of elastomeric material, said static seal surface comprising an external surface of annular shape extending around said axis, radially facing in a direction opposite said seal lip and mainly extending in a direction parallel to said axis (where "prevalently" is taken to mean that the component parallel to the axis is overall greater than the component that is perpendicular to the axis), said external surface being made of an elastomeric material that is softer than the elastomeric material of said connecting portion.

A twelfth embodiment of the invention is a seal made according to any preceding embodiment, in which said static seal surface comprises an external surface of annular shape extending around said axis, radially facing a direction opposite said seal lip and mainly extending in a direction parallel to said axis (where "prevalently" is taken to mean that the component parallel to the axis is overall greater than the component that is perpendicular to the axis), said annular portion further comprising an internal surface made of elastomeric material, radially facing said seal lip and opposite said external surface, said internal surface being of annular shape extending around said axis and radially facing the inside and mainly extending in a direction parallel to said axis (where "prevalently" is taken to mean that the component parallel to the axis is overall greater than the component that is perpendicular to the axis), said second end of the elastic arrangement being interposed between said annular locking element and said internal surface of the annular portion.

A thirteenth embodiment of the invention is a seal made according to the twelfth embodiment, in which said internal surface of the annular portion has an annular recess configured for receiving said second end of the elastic arrangement.

A fourteenth embodiment of the invention is a seal made according to any preceding embodiment, in which said elastic comprises at least a comb leaf spring.

A fifteenth embodiment of the invention is a seal made according to any preceding embodiment, in which said at least an annular lip is made of an elastomeric material that is softer than the elastomeric material of said static seal surface of the annular portion.

A sixteenth embodiment of the invention is a seal made according to any preceding embodiment, in which said static seal surface has an axial part mainly extending in an axial direction (where, i.e. the axial component is overall greater than the radial component) and a radial part mainly extending in a radial direction (i.e. where the radial component is overall greater than the axial component), said axial part being made of elastomeric material that is softer than said radial part.

A seventeenth embodiment of the invention is a seal, made particularly but not necessarily according to any of the preceding embodiments, said seal comprising:

an annular portion having a seal surface configured for the static seal in relation to a first element, said seal surface being made of an elastomeric material;

at least an annular lip configured for the dynamic seal in relation to a second element, said annular lip having a dynamic seal zone and a fixing zone, said dynamic seal zone extending in a circumferal direction around an axis, in particular an axis coinciding with a relative rotation axis between the first element and the second element, said fixing zone being fixed to said annular portion;

at least two reinforcing rings embedded in the elastomeric material of said annular portion, said reinforcing rings extending around said axis and having diameters that are different from one another, an annular layer of elastomeric material being interposed between said two reinforcing rings.

An eighteenth embodiment of the invention is a method for making a seal according to any preceding embodiment from the first to the sixteenth, said method comprising the steps of:

compression-moulding an annular body comprising an annular portion and at least an annular lip, said annular portion having a seal surface configured for the static seal in relation to a first element, said annular portion being made of an elastomeric material, said at least an annular lip being configured for the dynamic seal in relation to a second element, said annular lip having a dynamic seal zone and a fixing zone, said dynamic seal zone extending in a circumferal direction around an axis, in particular an axis coinciding with a relative rotation axis between the first element and the second element, said fixing zone being fixed to said annular portion;

providing an elastic arrangement having a first end intended for maintaining said dynamic seal zone of annular lip in a seal operating configuration and a second end opposite the first end;

providing an annular locking element for locking said second end of the elastic arrangement;

assembling together said moulded annular body, said elastic arrangement and said annular locking element so that said first end of the elastic arrangement is configured for maintaining said dynamic seal zone of the annular lip in a seal operating configuration and said second end of the elastic arrangement is interposed between said annular locking element and said seal surface.

A nineteenth embodiment of the invention is a method according to the eighteenth example, in which said compression-moulding step comprises the secondary steps of:

inserting into a mould a first element made of elastomeric material;

inserting into the mould and above said base element at least a second element and a fifth element, both made of elastomeric material, in which said second element is intended for forming said seal surface and said fifth element is intended for forming said seal lip.

A twentieth embodiment of the invention is a method according to the nineteenth embodiment, further comprising the steps of:

preparing an annular reinforcing element comprising a single block comprising at least two metal rings that are concentric and spaced apart from one another and an intermediate annular layer of elastomeric material arranged between said rings;

inserting said annular reinforcing element as a single block into said mould above said first element and between at least said second element and said fifth element.

A twenty-first embodiment of the invention is a method for making a seal, in particular but not necessarily according to any of the embodiments from the eighteenth to the twentieth, said method comprising the steps of:

preparing an annular reinforcing element comprising a single block having at least two metal rings that are concentric and spaced apart from one another and an intermediate annular layer of elastomeric material arranged between said annular bars;

compression-moulding an annular body comprising an annular portion, said annular reinforcing element and at least an annular lip, said annular portion having a seal surface configured for the static seal in relation to a first element, said annular portion being made of an elastomeric material, said annular reinforcing element being embedded in said annular portion, said at least an annular lip being configured for the dynamic seal in relation to a second element, said annular lip having a dynamic seal zone and a fixing zone, said dynamic seal zone extending in a circumferal direction around an axis, in particular an axis coinciding with a relative rotation axis between the first element and the second element, said fixing zone being fixed to said annular portion.

A twenty-second embodiment of the invention is a method according to the twenty-first example, in which said compression-moulding step comprises the secondary steps of:

inserting into a mould a first element made of elastomeric material;

inserting into the mould and above said first element at least a second element and a fifth element that are both made of an elastomer, in which said second element is intended for forming said seal lip and said fifth element is intended for forming said seal surface;

inserting into the mould, above said first element, said annular reinforcing element in a single block so that it is interposed between said second element and said fifth element.

The invention can be better understood and implemented with reference to the attached drawings, which illustrate an embodiment thereof by way of non-limiting example:

Figure 2:
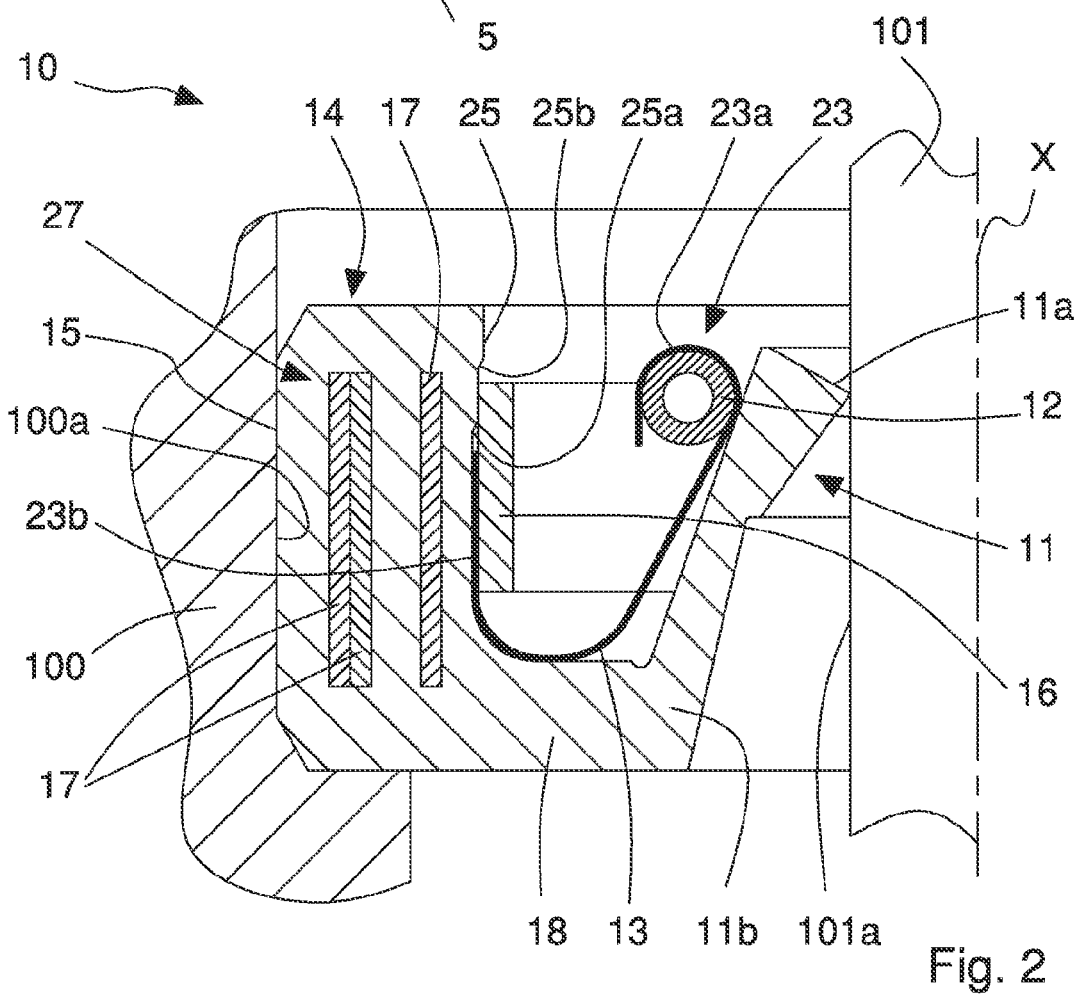
FIGS. 2 to 5 are four radial sections of four different embodiments of an annular seal according to the invention.

With reference to FIG. 2, 10 indicates overall an annular seal, 11 indicates a seal lip, 12 a garter spring, 13 a leaf spring, for example a comb leaf spring.

The seal 10 further comprises an annular portion 14 or back of the seal having a seal surface 15 configured for a static seal in relation to a seat 100*a* of a first element 100, for example a fixed support. The annular portion 14 is made of elastomeric material.

The seal lip 11 is intended, in use, for forming a dynamic seal with a sliding surface 101*a* of a movable second element 101, for example a rotating shaft. The springs 12, 13 cooperate to form the elastic arrangement 23 that in use press the seal lip 11 against the aforesaid sliding surface 101*a*.

The annular lip 11 has a dynamic seal zone 11a and an anchoring zone 11b. The dynamic seal zone 11a extends in a circumferal direction around an axis coinciding in use with a relative rotation axis X of the second element 101 with respect to the first element 100.

The anchoring zone 11b is solidly connected to the annular portion 14, as will be disclosed better below.

The elastic arrangement 23 has a first end 23a, that comprises the garter spring 12 that is partially wound by an end portion of the leaf spring 13. The first end 23a is configured for maintaining the aforesaid dynamic seal zone 11a of the annular lip 11 abutting on the sliding surface 101a of the second element 101, in a seal operating configuration. The formed elastic arrangement 23 further comprises a second end 23b opposite the first end 23a.

An annular locking element 16 is arranged for locking the second end 23b of the elastic arrangement 23. This second end 23b of the elastic arrangement is thus interposed between the annular locking element 16 and the annular portion 14 that is the static seal surface 15.

The second end 23b of the elastic arrangement 23 optionally has an annular shape extending around the rotation axis X of the second element 101 and has further, optionally, a radial section (i.e. that shown in FIG. 2) that mainly extends in a direction parallel to the aforesaid axis X.

The elastic arrangement 23 has overall, optionally, an annular form extending around the aforesaid rotation axis X of the second element 101 (axis coinciding in substance with the axis of the dynamic seal zone and between the seal lip 11 and the second element 101) and a substantially U-shaped, or V-shaped or fork-shaped radial section or anyway a radial section that defines two arms joined in a hinge zone and forming an angle that is less than 90° or even less than 60°.

Optionally, the annular lip 11 and the annular portion 14 are made of a single piece of elastomeric material (where it is possible to provide for this single piece being made by moulding and possibly being formed of different elastomeric materials or of materials with properties, for example hardness or flexibility that are different from one another according to the zone of the piece).

The seal 10 optionally comprises a first reinforcing arrangement 27 embedded in the elastomeric material of the annular portion 14 and optionally interposed between the second end 23b of the elastic arrangement 23 and the static seal surface 15 intended for contact with the seat 100a of the first element 100.

The first reinforcing arrangement 27 may have, as in the specific case, an annular shape extending around the aforesaid rotation axis X of the second element 101 (or the axis of the dynamic seal circumferal zone). The first reinforcing arrangement 27 can also optionally have a radial section (the section that is visible in FIG. 2) mainly extending in a direction parallel to the aforesaid rotation axis X; in other words the first reinforcing arrangement 27 can have, optionally, a radial section extending more in an axial direction rather than in a radial direction.

The first reinforcing arrangement 27 is optionally made of a metal material, for example of steel. The first reinforcing arrangement 27 can comprise, as in the specific case of FIG. 2, at least two reinforcing rings 17 embedded in the elastomeric material of the annular portion 14. Such reinforcing rings are optionally coaxial with the aforesaid rotation axis X with the diameters that are different from one another. It is optionally provided that the first reinforcing arrangement 27 comprises a part of elastomeric material of the annular portion 14 interposed between these two reinforcing rings 17.

The annular reinforcing structure may comprise, as in the specific case disclosed here, a plurality of rings of different diameter, arranged concentrically with respect to one another. In the specific case of FIG. 2 three rings 17 were used, two of which were arranged contiguously to one another, whilst the third ring (the one with the lesser diameter) is spaced away from the other two with the interposition of an annular layer of elastomeric material. This annular layer interposed between two annular rings forms a soft core that enables a certain lightness to be maintained for the structure overall, ensuring great robustness at the same time. It should be observed that it is possible to arrange for more than one core made of elastomeric material being arranged between two metal rings with a different diameter.

Each of these rings 17 can be obtained, for example from a metal belt (for example steel possessing optionally great hardness, such as Aisi 301 steel) cut and joined at the ends (for example by welding, in particular by TIG welding, or by means of a spot welder, or by means of other known joining systems) to form the ring.

The seal also optionally further comprises a connecting portion 18, or seal base, that joins together the annular lip (in particular the anchoring end 11b) and the annular portion 14 that shows the static seal surface 15. The connecting portion 18 can be made of elastomeric material, for example of the same material of the annular portion 14 or of a harder material than the annular portion 14.

It should be observed that the static seal surface 15 that is intended for at least partial contact with the seat 100a of the first element 100, may comprise, as in the specific case disclosed here, an external surface of annular shape extending around the aforesaid rotation axis X, radially facing an opposite part of the seal lip 11 and mainly extending in a direction parallel to this axis X. This external surface is, optionally, made of a softer elastomeric material (for example 80° Shore A hardness) than the elastomeric material of the connecting portion 18 (for example 90° Shore A hardness). It is nevertheless possible to provide for a static seal surface 15 having an extension such that it can also be extended in a direction that is not parallel (that is for example tilted or perpendicular) with respect to the rotation axis. It is possible to provide, for example, for the static seal surface 15 being defined also on at least a side of the connecting portion 18. Part of the static seal surface can be made of an elastomeric material of greater hardness than that on another side of the static seal surface. It is for example possible to provide for the part of static seal surface that is less hard being orientated so as to be overall more parallel to the rotation axis X than to the part of static seal surface having a greater hardness.

The annular portion 14 further comprises an internal surface 25 facing the seal lip 11, which is optionally also made of elastomeric material, which is opposite the aforesaid static seal external surface 15, this internal surface 25 being of annular shape, also extending around the aforesaid axis X and radially facing the inside and always extending, preferably, in a direction parallel to the axis X. It is further optionally provided that the second end 23b of the elastic arrangement 23 is interposed between the annular locking element 16 and the internal surface 25 of the annular portion 14 that has just been mentioned.

This internal surface 25 of the annular portion 14 optionally comprises an annular recess 25a that is configured for receiving the second end 23b of the elastic arrangement 23, in particular a further end portion of the comb spring 13, and for promoting the positioning and the fixing thereof by the locking element 16.

The internal surface 25 also comprises a second annular protrusion 25b configured for receiving and retaining the annular locking element 16.

It is possible, as in the specific case disclosed here, that the annular lip 11, in particular the end 11a of the annular lip intended for operating seal contact with the second external element 101 is made of a softer elastomeric material, for example with 70° Shore A hardness, than the elastomeric material of the static seal surface 15 of the annular portion, i.e. of the surface intended for contact with the first element 100.

It can be observed, with reference to the seal in FIG. 2, that it has been possible to obtain a seal provided with elastic arrangement 23, that is able to ensure an optimum work situation of the dynamic seal arrangement (lip 11) for a long time, and can at the same time be effectively and firmly fixed to a structure (annular portion 14) that is in turn able to reduce the risk of damage to the seat 100a of the seal.

Figure 1:
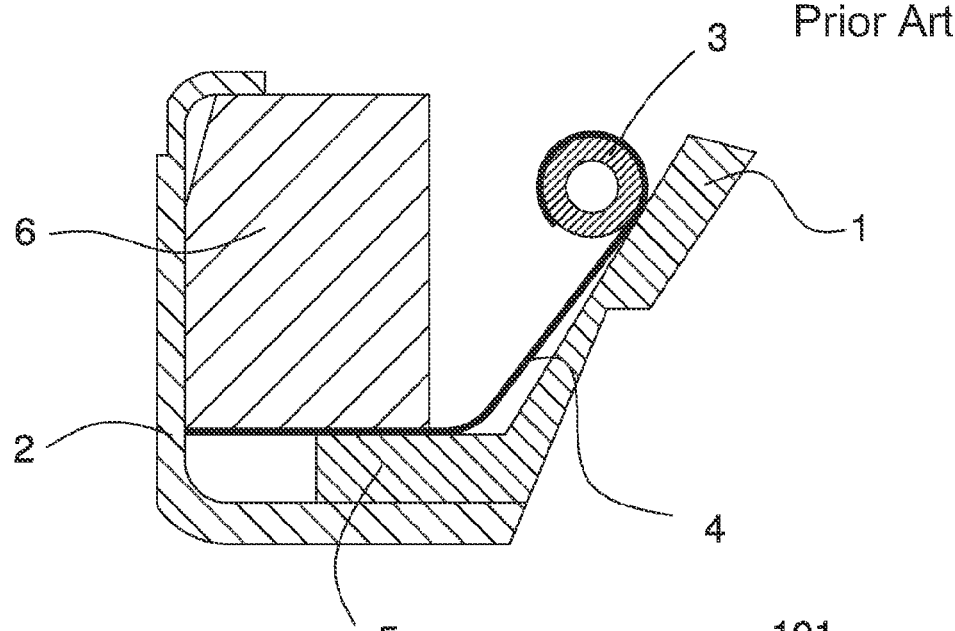
FIG. 1 is a radial section of a radial annular seal made according to the prior art.

It is also observed that the seal 10 of FIG. 2 avoids, compared with the known seal of FIG. 1, the use of rather bulky and heavy elements, such as the annular locking element 6, or elements that are rather complicated and difficult to make, such as the box 2 having an "L" section and a further angular closing protrusion of the aforesaid locking element 6.

It can also be observed that in the seal in FIG. 2 it was possible to fix the elastic arrangement 23 (in particular the end 23b) with an easy teaching and by arrangement of a locking element 16 that is relatively simple and light and is easy to insert/apply.

A further observation relates to the fact that the elastic arrangement 23 is anchored to a circumferal zone of the seal 10 having a prevalently axial extent, i.e. parallel to the rotation axis X of the second element 101. This teaching, as has been seen, enables a locking element 16 to be used the use and structure of which are particularly simple and practical.

Further the advantageous aspects of the functionality of the prior-art dynamic seal element of FIG. 1 are retained, i.e. in particular the possibility of free sliding on the second, for example movable, element, and thus of adapting to the different operating situations that may arise.

It is also seen that the various seal surfaces are made of deformable materials having different degrees of deformability: in particular it is possible to provide for the material of the dynamic seal arrangement (lip 11) being softer than the material of the static seal element (surface 15) that can in turn be softer than the material of the connecting portion 18 to which the dynamic seal element is anchored.

It can finally be observed that using a single and compact block made of elastomeric material (possibly reinforced internally with cores embedded in the material) that performs the dual role of defining the static seal surface in relation to a first external element (support) and also of defining the attachment surface of the elastic arrangement 23, is a teaching that enables great efficacy and reliability of the elastic arrangement and therefore of the dynamic seal element to be obtained even for a long period of time. At the same time this teaching ensures a static seal that is tough and secure and which does not cause a risk of damage to the seat 100a of the sealor a risk also of damage to the seal following dismantling thereof. It has in fact been seen that the seal in FIG. 2 in addition to not damaging the seat 100a to which it is mounted either during the steps of mounting/dismantling or during use, it being particularly flexible, can also be reused as the risk of damage thereto during dismantling is very reduced.

Figure 3:
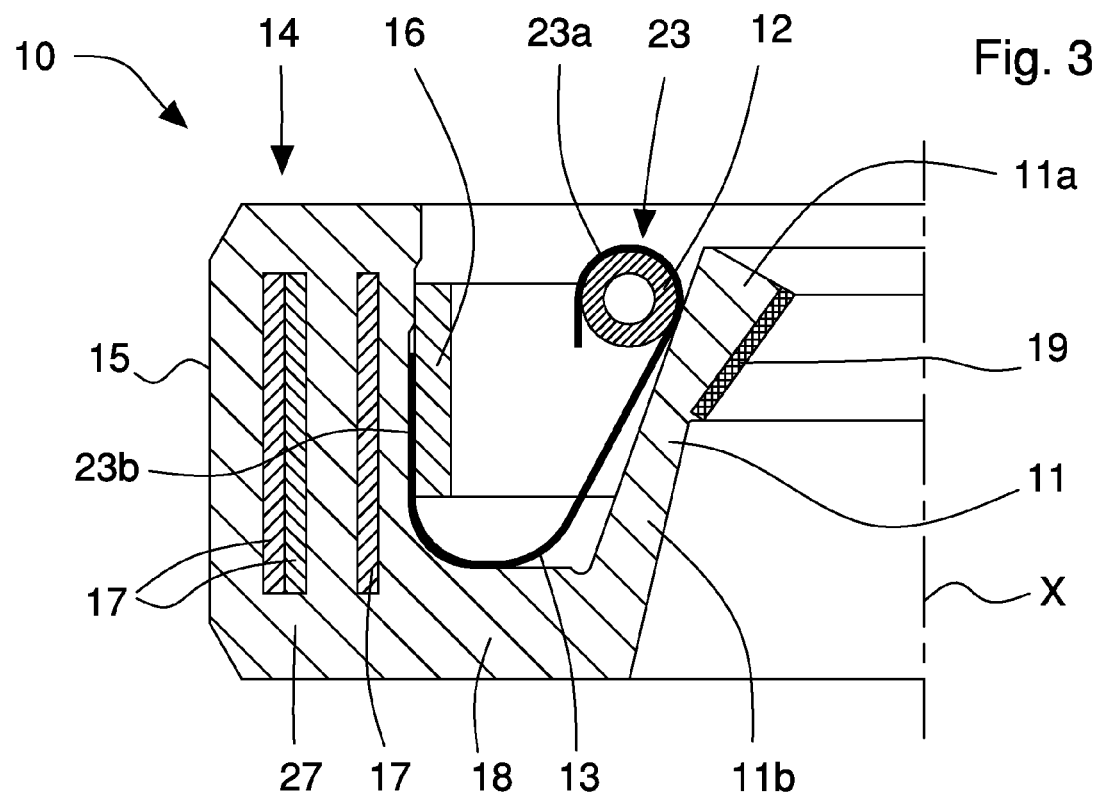

With reference to FIG. 3, another embodiment of the seal 10 is illustrated in which the elements that are similar to those of the seal in FIG. 2 have been indicated by the same numbering.

The seal in FIG. 3 is provided with an insert 10 made of hardwearing material that is arranged on the end 11a of the seal lip 11, in particular on the zone intended for the seal contact with the sliding surface 101a of the second element 101.

This insert 19 can be made, for example, of PTFE or of another material provided, compared with the elastomeric material of the seal lip 11, with greater resistance to abrasion and with the capacity to reduce sliding attrition. This insert 19 enables the life of the seal element to be increased by reducing, inter alia, the risk of reaching high temperatures that may cause the elastomeric material of the seal lip 11 to deteriorate.

Figure 4:
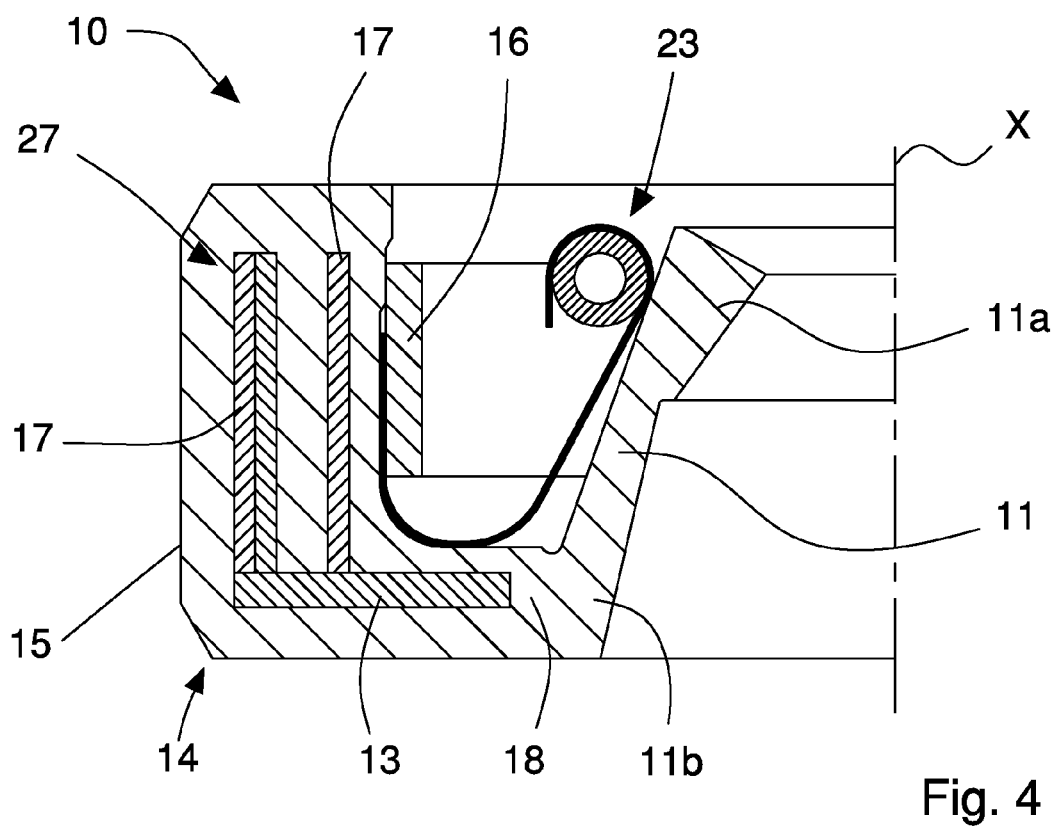

With reference to FIG. 4, a third embodiment of the seal 10 is illustrated, in which elements similar to those of FIG. 2 are indicated by the same number.

The seal in FIG. 4 is further stiffened, with respect to the seals of FIGS. 2 and 3, through the effect of the arrangement of a second reinforcing arrangement 20 comprising at least a second ring 20, for example made of metal material, that, optionally, can be added to the first annular reinforcing arrangement 27 that has already been disclosed previously. This optionally additional second ring 20 can also be constructed from a belt of steel joined at the ends. The reinforcing second ring 20 is arranged embedded in the connecting portion 18. The secondreinforcing ring 20 has a radial section that extends prevalently in a radial direction. This second ring 20, with a prevalently radial extent that enables the locking capacity of the seal to be increased inside the seat, can be used, for example, if strong vibrations or high levels of other types of stress occur.

Figure 5:
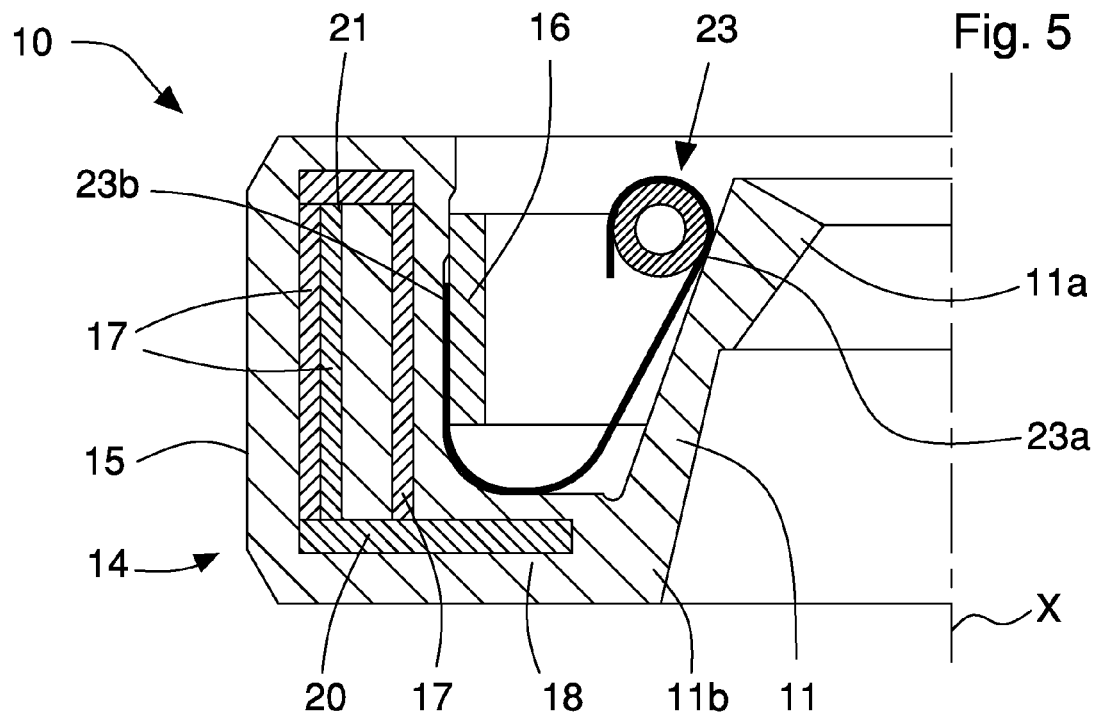

With reference to FIG. 5, there is illustrated another embodiment of the seal, in which elements similar to those of the seals in FIGS. 2 and 4 have been indicated by the same numbering.

The seal in FIG. 5 comprises a third reinforcing arrangement including a third ring 21 arranged on the opposite side of the second ring 20 and obtained from a belt of steel joined at the ends, having a radial section that extends prevalently in a radial direction. Also in this case the third reinforcing ring 21 gives greater stiffness and robustness to the body of the seal.

Subsequently, in particular with reference to FIG. 6, the method of making the seal in FIG. 2 is disclosed.

The method provides for the use of a mould consisting of three plates 31, 32 and 33, in which the plates 31 and 33 are applied to the two planes of a press whilst the plate 32 is moved by an extracting device to enable the exit of the seal from the mould.

The method in the first place provides for the formation of the reinforcing rings (in this specific case three in number but they could be one or two or more than three) that will be contained in the first reinforcing arrangement 27 embedded in the elastomeric material. These rings will be produced, as said, by a metal belt folded as a ring and joined at the ends.

Figure 6:
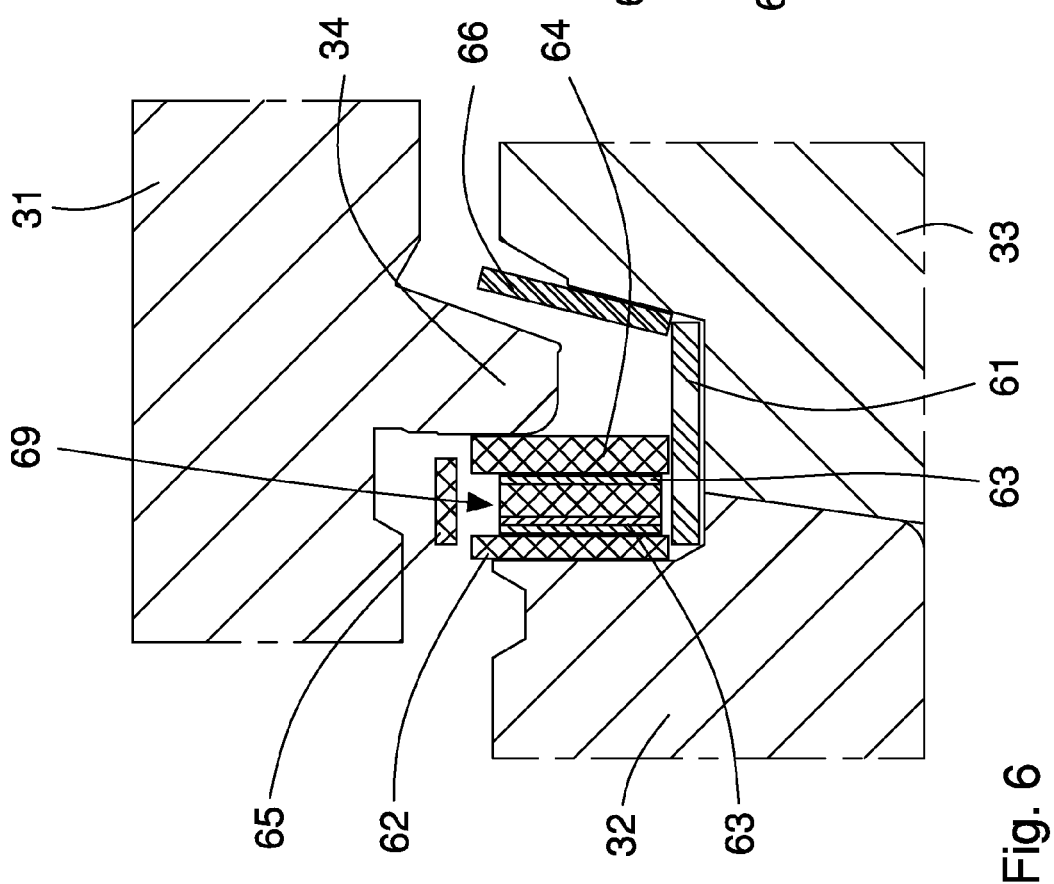
FIG. 6 shows a loading step of a mould in a manufacturing method for manufacturing the seal in FIG. 2 according to the invention.

These rings, indicated by 63 in FIG. 6, are, as said, of a different diameter and will be arranged concentrically together with interposing, between at least two adjacent but spaced rings, of an annular strip made of elastomeric material (for example of 80° Shore A hardness) inside a vulcanisation system. The latter, that is of known type and is not illustrated, for example a system comprising an autoclave, a press, or other devices that are suitable for vulcanisation, is able to obtain a single annular reinforcing block 69 that will constitute the first reinforcing arrangement 27 and can subsequently be positioned more easily and with greater precision inside the mould of FIG. 6. It is possible to provide, for example, for the use of two or more strips of elastomeric material of a different diameter arranged concentrically, in an alternate manner, between three and more reinforcing metal rings 63, always with the aim of first obtaining a single block 69 that will then form the first reinforcing arrangement 27 of the annular seal.

The method of making further provides a preparing step for preparing a plurality of strips made of elastomeric material that must then be positioned inside the mould in FIG. 6. These strips optionally comprise a first strip 61 of annular shape with a radial section with a prevalently radial extent, which during the mould loading step will form the base of the load on which various other elements of the load will be rested. This first strip 61 (base strip), which will finally form a considerable part of the connecting portion 18 of the seal, will consist of relatively hard elastomeric material, which is in particular harder than the elastomeric material of the strip(s) interposed between the reinforcing rings 63 (for example it can be 90° Shore A hardness).

The aforesaid strips further comprise a second annular strip 62 with a radial section with a prevalently axial extent and made of an elastomeric material that is softer than the material of the first base strip 61 (for example it can have 80° Shore A hardness). This second strip 62 will generate the static seal surface 15 that, in use, will be positioned so as to face in a radial direction, in particular with reference to the axis X. The external diameter of the second strip 62 will be less or almost the same as the external diameter of the imprint of the mould. The internal diameter of the second strip 62 will be greater or at least the same as the external diameter of the single reinforcing block 69. The aforesaid strips of elastomeric material also comprise a third annular strip 64 (with a substantially axial radial section) with an external diameter that is less than or substantially the same as the internal diameter of the single annular reinforcing block 69 and with an internal diameter that is greater than or almost the same as the internal diameter of an annular protrusion 34 carried by the plate 31 and intended for forming an annular notch of the seal that will then be the housing seat of the elastic arrangement 23.

A fourth annular strip 65 is then arranged with a radial section with a substantially radial extent with external and internal diameters comprised between the external diameter of the impression of the mould (defined by the plate 32) and the external diameter of the aforesaid annular protrusion 34 of the plate 31. The strips 64 and 65 can be made, for example, with an elastomeric material having the same hardness as the material of the second strip 62 (that is thus softer than the base strip 61).

A fifth annular strip 66 is then provided that, in the specific case, has a radial section with a prevalently axial extent but which is positioned with a slight radial tilt to the inside. The fifth strip 66 will substantially form the seal lip 11 and will be made of a softer elastomeric material (for example having 70° Shore A hardness) than the material of the more internal second ring 62. The fifth strip 66 will have an external diameter that is variable in an axial direction, having a tilted radial section but being substantially less or almost the same as the internal diameter (which is also variable in an axial direction) of the aforesaid protrusion 34 of the plate 31 and substantially greater or almost the same as the external diameter (which is also variable in an axial direction) of the impression of the mould defined by the plate 33.

The method of making then further provides placing the plates 32 and 33 alongside so as to define the lower surface of the impression of the mould and thus a loading zone open above. The plates 32 and 33 are coupled with a known movement device that is not illustrated. After this the first base strip 61 is inserted on the bottom of the mould, thus of the various other strips with also the single reinforcing block 69. In particular the second annular strip 62 will then be rested on the most external zone of the impression of the mould, which is contiguous with or almost in contact with the surface of the impression facing radially outwards and having a greater diameter. Yet more in particular, it will be possible, for example, to insert first the second strip 62 on the more external part of the impression and then insert the annular reinforcing arrangement that includes the metal rings 63, incorporated by previous vulcanisation with at least an intermediate layer of elastomeric material, then again inserting the third strip 64 inside the reinforcing arrangement and the fourth strip 65 of cover arranged above the pack of annular elements that have already been inserted for closing the arrangement above. Lastly, the outermost and softest fifth strip 66 is inserted.

Subsequently, the upper plate 31 and all the lower plates 32 and 33 are closed to form the definitive impression, after which forming by pressure-moulding occurs, which will in general entail the fusion of the elastomeric material (for this purpose the plates of the mould can be of the heatable type), the compression and the vulcanisation of the elements loaded into the mould, by using preset operating parameters (for example relating to the temperature, compression force, the stay time into the mould, etc), which being substantially known are not further discussed. Also the extraction from the mould will occur with substantially known methods that do not therefore require particular explanations.

If the seal to be made also comprises a second reinforcing element embedded in the elastomeric material of the connecting portion 18 and having an annular shape with a radial section extending prevalently in a radial direction (such as, for example, the second ring 20 of FIGS. 4 and 5) this further reinforcing element during the mould loading step will be inserted into and rested above the first base strip 61 before the insertion of other elements, in particular before the single block that includes the reinforcing rings 63.

If the seal to be manufactured also comprises a wearproof cover on the dynamic seal zone (for example the insertion 19 of the example in FIG. 3) it is possible to provide the insertion into the inside of the open mould, during the loading step before compression-moulding and heating, of an annular belt 70 made of the desired wear-proof material (for example PTFE) and arranged next to the softer strip 66 intended for forming the seal lip 11.

Figure 7:
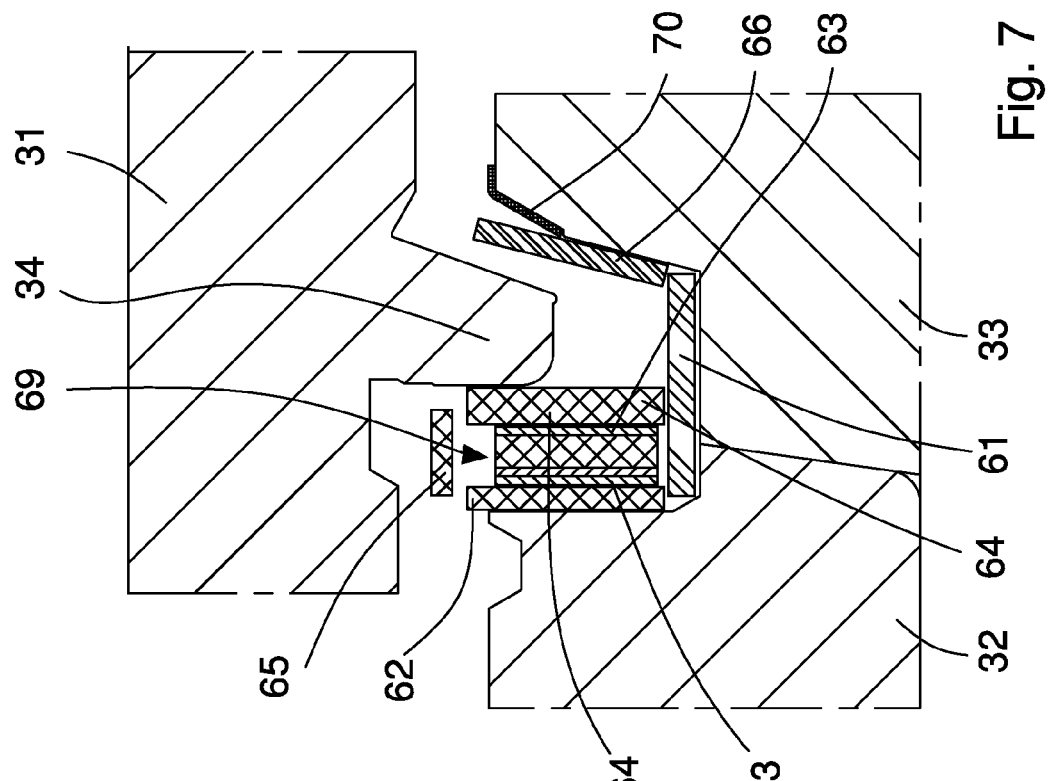
FIG. 7 shows a loading step of the mould in a manufacturing method for manufacturing the seal in FIG. 3 according to the invention.

The belt 70 can, optionally, be rested on a tilted annular surface that defines the impression of the mould and is arranged further inside in a radial direction and is spaced apart with respect to the fifth strip 66 (FIG. 7).

With the compression-moulding step that has just been disclosed the main body of the seal is obtained.

Figure 8:
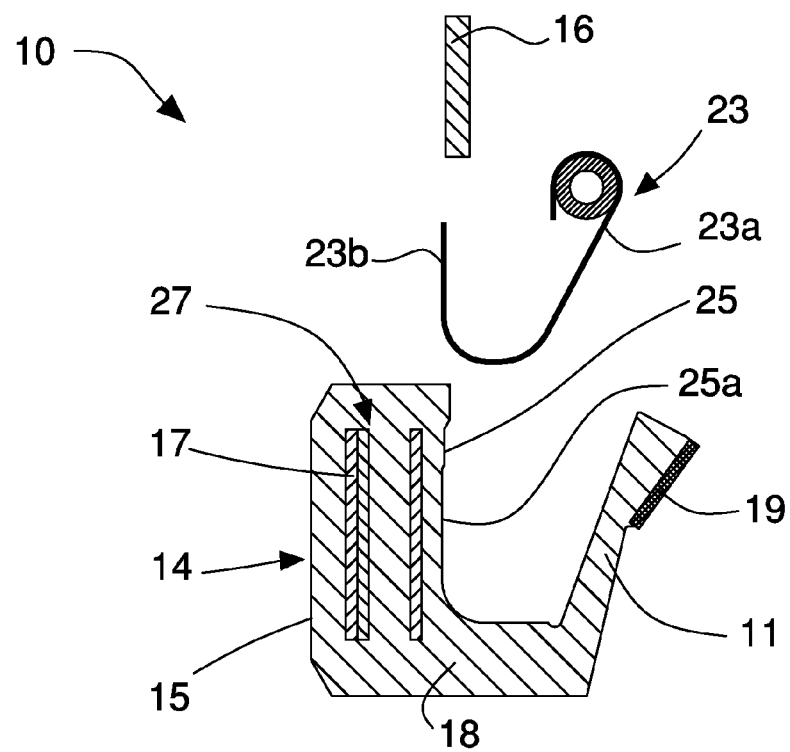
FIG. 8 shows an assembly step subsequent to moulding in a method for manufacturing the seal in FIG. 3 according to the invention.

With reference to FIG. 8, the assembling step of the elastic arrangement 23 to the main body of the seal is schematically illustrated. This assembly step is preceded by a step of preparing the elastic arrangement 23. This preparing step comprises cutting the leaf spring 13 and the garter spring 12 of the desired dimensions, then the insertion of the garter spring 12 into the first end portion of the leaf spring 13 which is then closed to fix the garter spring 12 in order to form the first end 23a of the elastic arrangement 23 that will be directly operational (in contact) with the dynamic seal lip 11. The (comb) leaf spring 13 is folded so as to have a U o V-shape or anyway forked radial section with two hinged arms that, following the arrangement assumed through the effect of the assembly, will both be orientated prevalently in the axial direction (always with reference to the axis defined by the overall annular conformation of the seal, an axis that in substance coincides with the axis X of the second element 101 when the seal will be in the operating configuration).

The assembly (FIG. 8) optionally provides gluing the second end 23b of the elastic arrangement 23 opposite the first free end 23a on the internal surface 25 of the annular portion 14 and the successive further fixing of the elastic arrangement by insertion of the annular locking element 16, for example with a further forcing so as to obtain solid fixing of the elastic arrangement by interference.

Optionally, gluing the annular locking element 16 on the internal surface 25 of the annular portion 14 and on the second end 13b of the elastic arrangement 23 is also provided.

The internal surface 25 optionally comprises a recess 25a that defines an annular seat configured for receiving in a preset position the second end 23b (fixing end) of the elastic arrangement 23, in particular a second end portion of the comb spring 23.

This internal surface 25 is positioned so as to face in a direction that is prevalently radial towards the inside. In the specific case this internal surface 25 is substantially cylindrical, in particular has a straight cylindrical shape that is coaxial with the axis of the seal, even if it is possible to provide a surface with a slightly frustoconical shape or anyway with a shape of variable diameter or at least with surface portions having at least an axial component, i.e. not completely facing a radial direction. This internal surface will optionally have a prevalently radial extent, for example with a tilt that is substantially equal to 0° with respect to the axis of the seal as in the examples illustrated in the attached figures, or with a tilt that is not greater than 45° or 30°. In particular, this internal surface will be configured so that the second fixing end 23b of the elastic arrangement 23 is interposed between the annular locking element 16 and the reinforcing arrangement 27 inside the body of the seal.

It should lastly be observed that the second end 23b of the elastic arrangement 23 has at least a part that extends in a direction that is prevalently axial and which is interposed, in a radial direction, between the annular locking element 16 and at least that part of the static seal surface 15 that has a prevalently axial extent. This relative configuration of the locking element, of the elastic arrangement and of the static seal surface in elastomeric material, gives the advantage of providing a seal provided with operating elastic arrangement on the dynamic seal element with great reliability and provided at the same time with static seal element that is particularly effective and with a reduced risk of causing damage to the seat of the seal.

The invention claimed is:

1. A seal comprising:
   an annular portion having a static seal surface configured for a static seal in relation to a first element, said static seal surface being made of an elastomeric material, said static seal surface being extended at least partially or mainly in a direction parallel to an axis, in particular an axis coinciding with a relative rotation axis between said first element and a second element, said static seal surface made of said elastomeric material being the most peripheral surface of said annular portion and being mounted to said first element in contact thereto;
   at least an annular lip configured for a dynamic seal in relation to said second element, said annular lip having a dynamic seal zone and a fixing zone, said dynamic seal zone extending in a circumferal direction around said axis, said fixing zone being fixed to said annular portion;
   an elastic arrangement comprising an annular spring and a garter spring that is partially wound by an end portion of said annular spring, a first end, configured for maintaining said dynamic seal zone of the annular lip abutting on said second element in an operating configuration, and a second end having an annular shape extending around said axis, said second end having a radial section extending prevalently in a direction parallel to said axis;
   an annular locking element for locking said second end of said elastic arrangement,
   wherein,
   said first end comprises said garter spring,
   said second end is interposed in a radial direction between said annular locking element and said static seal surface, and
   said second end comprises a portion of said annular spring that is fixed to said static seal surface by said annular locking element and not through direct vulcanization.

2. A seal comprising:
   an annular portion having a static seal surface configured for a static seal in relation to a first element that is external to said seal, said static seal surface being made of an elastomeric material, said static seal surface being extended at least partially or mainly in a direction parallel to an axis, in particular an axis coinciding with a relative rotation axis between said first element and a second element that is external to said seal, said static seal surface made of said elastomeric material being mounted to said first element in contact thereto;
   at least an annular lip configured for a dynamic seal in relation to said second element, said annular lip having a dynamic seal zone and a fixing zone, said dynamic seal zone extending in a circumferal direction around said axis, said fixing zone being fixed to said annular portion;
   an elastic arrangement comprising an annular spring and a garter spring that is partially wound by an end portion of said annular spring, a first end, configured for maintaining said dynamic seal zone of the annular lip abutting on said second element in an operating configuration, and a second end having an annular shape extending around said axis, said second end having a radial section extending prevalently in a direction parallel to said axis, said first end comprising said garter spring;
   an annular locking element for locking said second end of said elastic arrangement, said annular locking element having a radial section extending prevalently in a direction parallel to said axis, said second end being interposed in a radial direction between said annular locking element and said static seal surface,
   said second end comprising a portion of said annular spring that is fixed to said static seal surface by said annular locking element and not through direct vulcanization.

3. The seal according to claim 2, wherein said elastic arrangement has an annular shape extending around said axis and a radial section with two arms hinged together and arranged with respect to one another so as to define an angle, in particular less than 90°.

4. The seal according to claim 2, comprising a first reinforcing arrangement embedded in an elastomeric material of said annular portion and interposed between said second end of the elastic arrangement and said static seal surface.

5. The seal according to claim 4, wherein said first reinforcing arrangement comprises at least two reinforcing rings embedded in an elastomeric material of said annular portion, said reinforcing rings extending around said axis and having diameters that are different from one another, an annular layer of elastomeric material being interposed between said at least two reinforcing rings.

6. The seal according to claim 2, comprising a connecting portion that joins together said annular lip and said annular portion, said connecting portion being made of elastomeric material, said seal comprising a second reinforcing arrangement embedded in the elastomeric material of said connecting portion.

7. The seal according to claim 2, comprising a connecting portion that joins together said annular lip and said annular portion, said connecting portion being made of elastomeric material, said static seal surface comprising a surface of annular shape extending around said axis and radially facing a side opposite said seal lip and mainly extending in a direction parallel to said axis, said surface being made of an elastomeric material that is softer than the elastomeric material of said connecting portion.

8. The seal according to claim 2, wherein said annular lip is made of an elastomeric material that is softer than the elastomeric material of said static seal surface.

9. The seal according to claim 2, wherein said static seal surface has an axial part mainly extending in an axial direction and a radial part mainly extending in a radial direction, said axial part being made of elastomeric material that is softer than said radial part.

10. The seal according to claim 2, wherein said annular lip and said annular portion are made of a single body.

11. The seal according to claim 2, wherein said annular portion comprises an internal surface facing said annular lip, said internal surface being made of an elastomeric material, said internal surface being opposite said static seal surface, said internal surface being of annular shape extending around said axis X and radially facing inwardly and extending in a direction parallel to said axis; said second end being interposed between said annular locking element and said internal surface; said internal surface comprising an annular recess configured for receiving said second end of said elastic arrangement and for promoting positioning and fixing thereof by said annular locking element.

12. The seal according to claim 11, wherein said internal surface comprises an annular protrusion configured for receiving and retaining said annular locking element.

* * * * *